(12) United States Patent
Brooks et al.

(10) Patent No.: US 10,133,931 B2
(45) Date of Patent: Nov. 20, 2018

(54) ALERT NOTIFICATION BASED ON FIELD OF VIEW

(71) Applicant: FMR LLC, Boston, MA (US)

(72) Inventors: Seth Warren Brooks, South Easton, MA (US); John McDonough, Nahant, MA (US); Hadley Rupert Stern, West Newton, MA (US)

(73) Assignee: FMR LLC, Boston, MA (US)

( * ) Notice: Subject to any disclaimer, the term of this patent is extended or adjusted under 35 U.S.C. 154(b) by 2 days.

(21) Appl. No.: 14/817,579

(22) Filed: Aug. 4, 2015

(65) Prior Publication Data

US 2017/0039426 A1  Feb. 9, 2017

(51) Int. Cl.
  *G06K 9/00* (2006.01)
  *G06F 17/30* (2006.01)
  *G06K 9/32* (2006.01)

(52) U.S. Cl.
  CPC ..... *G06K 9/00671* (2013.01); *G06F 17/3087* (2013.01); *G06F 17/30265* (2013.01); *G06K 9/3241* (2013.01); *G06K 9/3258* (2013.01)

(58) Field of Classification Search
  CPC .. G06T 19/006; G06F 3/0482; G06F 3/04842
  See application file for complete search history.

(56) References Cited

U.S. PATENT DOCUMENTS

| 6,037,936 A | * | 3/2000 | Ellenby | G01C 17/34 |
|---|---|---|---|---|
| | | | | 348/211.8 |
| 2002/0045988 A1 | | 4/2002 | Yokota | |
| 2007/0067290 A1 | | 3/2007 | Makela | |
| 2007/0162942 A1 | | 7/2007 | Hamynen et al. | |
| 2009/0182499 A1 | | 7/2009 | Bravo | |
| 2012/0246027 A1 | | 9/2012 | Martin | |
| 2012/0246222 A1 | | 9/2012 | Martin | |
| 2013/0093788 A1 | * | 4/2013 | Liu | G06F 3/011 |
| | | | | 345/633 |
| 2013/0293530 A1 | | 11/2013 | Perez et al. | |
| 2014/0304122 A1 | * | 10/2014 | Rhoads | G06Q 30/0643 |
| | | | | 705/27.2 |
| 2015/0073907 A1 | | 3/2015 | Purves et al. | |

OTHER PUBLICATIONS

Office Action in corresponding U.S. Appl. No. 13/325,296, dated Jun. 21, 2013, pp. 1-17.

(Continued)

*Primary Examiner* — Jeffrey Chow
(74) *Attorney, Agent, or Firm* — Proskauer Rose LLP

(57) ABSTRACT

Techniques for collecting and presenting information using a wearable device involve receiving criteria information data that specifies one or more criteria for providing information to a user of a wearable device; receiving information indicative of a field of view of the user of the wearable device; detecting that an object in the field of view is associated with one or more attributes that satisfy the user-specified criteria; responsive to detection, executing a rule associated with one or more attributes that satisfy the user-specified criteria; and based on execution of the rule, causing an informational depiction to be presented via a display of the wearable device that visually eliminates or enhances the detected object in the field of view of the user.

26 Claims, 3 Drawing Sheets

(56) References Cited

OTHER PUBLICATIONS

Response to Office Action dated Jun. 21, 2013, in corresponding U.S. Appl. No. 13/325,296, filed Oct. 16, 2013, pp. 1-17.
Final Office Action in corresponding U.S. Appl. No. 13/325,296, dated Jan. 31, 2014, pp. 1-29.
Response to Final Office Action dated Jan. 31, 2014, in corresponding U.S. Appl. No. 13/325,296, filed Apr. 23, 2014, pp. 1-17.
RCE & Response to Final Office Action dated Jan. 31, 2014, in corresponding U.S. Appl. No. 13/325,296, filed Apr. 30, 2014, pp. 1-17.
Office Action in corresponding U.S. Appl. No. 13/325,296, dated Nov. 6, 2014, pp. 1-24.
Response to Office Action dated Nov. 6, 2014, in corresponding U.S. Appl. No. 13/325,296, filed Jan. 20, 2015, pp. 1-18.
Final Office Action in corresponding U.S. Appl. No. 13/325,296, dated Mar. 26, 2015, pp. 1-39.
Response to Final Office Action dated Mar. 26, 2015, in corresponding U.S. Appl. No. 13/325,296, filed Jun. 26, 2015, pp. 1-21.
Notice of Appeal in corresponding U.S. Appl. No. 13/325,296, dated Jul. 22, 2015, p. 1.
Office Action in corresponding U.S. Appl. No. 13/325,335, dated Jun. 5, 2014, pp. 1-15.
Response to Office Action dated Jun. 5, 2014, in corresponding U.S. Appl. No. 13/325,335, filed Jul. 10, 2014, pp. 1-13.
Office Action in corresponding U.S. Appl. No. 13/325,335, dated Nov. 12, 2014, pp. 1-15.
Response to Office Action dated Nov. 12, 2014, in corresponding U.S. Appl. No. 13/325,335, filed Feb. 5, 2015, pp. 1-14.
Response to Office Action dated Nov. 12, 2014, in corresponding U.S. Appl. No. 13/325,335, filed Jun. 2, 2015, pp. 1-8.

* cited by examiner

ALERT NOTIFICATION BASED ON FIELD OF VIEW

BACKGROUND

This disclosure relates to collecting and presenting information using a wearable device.

Wearable devices include clothing and accessories that incorporate a computer. Some wearable devices also incorporate other advanced electronic technologies. Wearable devices include activity trackers, smart watches, and smart glasses. An activity tracker monitors and tracks fitness-related metrics such as distance walked, calories consumed, and in some cases, heartbeat and quality of sleep. Smart watches and smart glasses run applications, make and answer phone calls, play media files, collect information from sensors, communicate with other devices, and perform other functionalities. A wearable device provides information to an individual through a display of the wearable device or through a connected computer or smartphone.

SUMMARY

According to an aspect, a system includes one or more processors configured to receive criteria information data that specifies one or more criteria for providing information to a user of a wearable device; receive information indicative of a field of view of the user of the wearable device; detect that an object in the field of view is associated with one or more attributes that satisfy the user-specified criteria; responsive to detection, execute a rule associated with one or more attributes that satisfy the user-specified criteria; and based on execution of the rule, cause an informational depiction to be presented via a display of the wearable device that visually eliminates or enhances the detected object in the field of view of the user.

Implementations of the disclosure include one or more of the following features. The system receives location data indicative of a current geographic location of the user and identifies the one or more objects in the field of view based on the location data. The system causes alternative recommendations information to be presented via the display of the wearable device based on the one or more criteria. The system receives one or more images captured by a camera of the wearable device, and identifies the one or more objects in the one or more images captured by the camera. The system identifies the one or more objects in the one or more images captured by the camera using optical character recognition. The system receives, from a physiological state monitor, physiological data that specifies a physiological state of the user and determines the one or more criteria based on the physiological state of the user. The one or more criteria includes at least one of an attribute of a product, an attribute of a company, or a value relating to a financial item. The system retrieves notification information pertaining to one or more objects in the field of view and causes the notification information to be presented via a display of the wearable device based on the retrieved information satisfying the one or more criteria. The system is the wearable device or one or more computing server systems.

All or part of the foregoing is implemented as a computer program product including instructions that are stored on one or more non-transitory machine-readable storage media, and that are executable on one or more processing devices. All or part of the foregoing is implemented as an apparatus, method, or electronic system that includes one or more processing devices and memory to store executable instructions to implement the stated functions.

The details of one or more implementations are set forth in the accompanying drawings and the description below. While specific implementations are described, other implementations exist that include operations and components different than those illustrated and described below. Other features, objects, and advantages will be apparent from the description, the drawings, and the claims.

DETAILED DESCRIPTION

Figure 1:
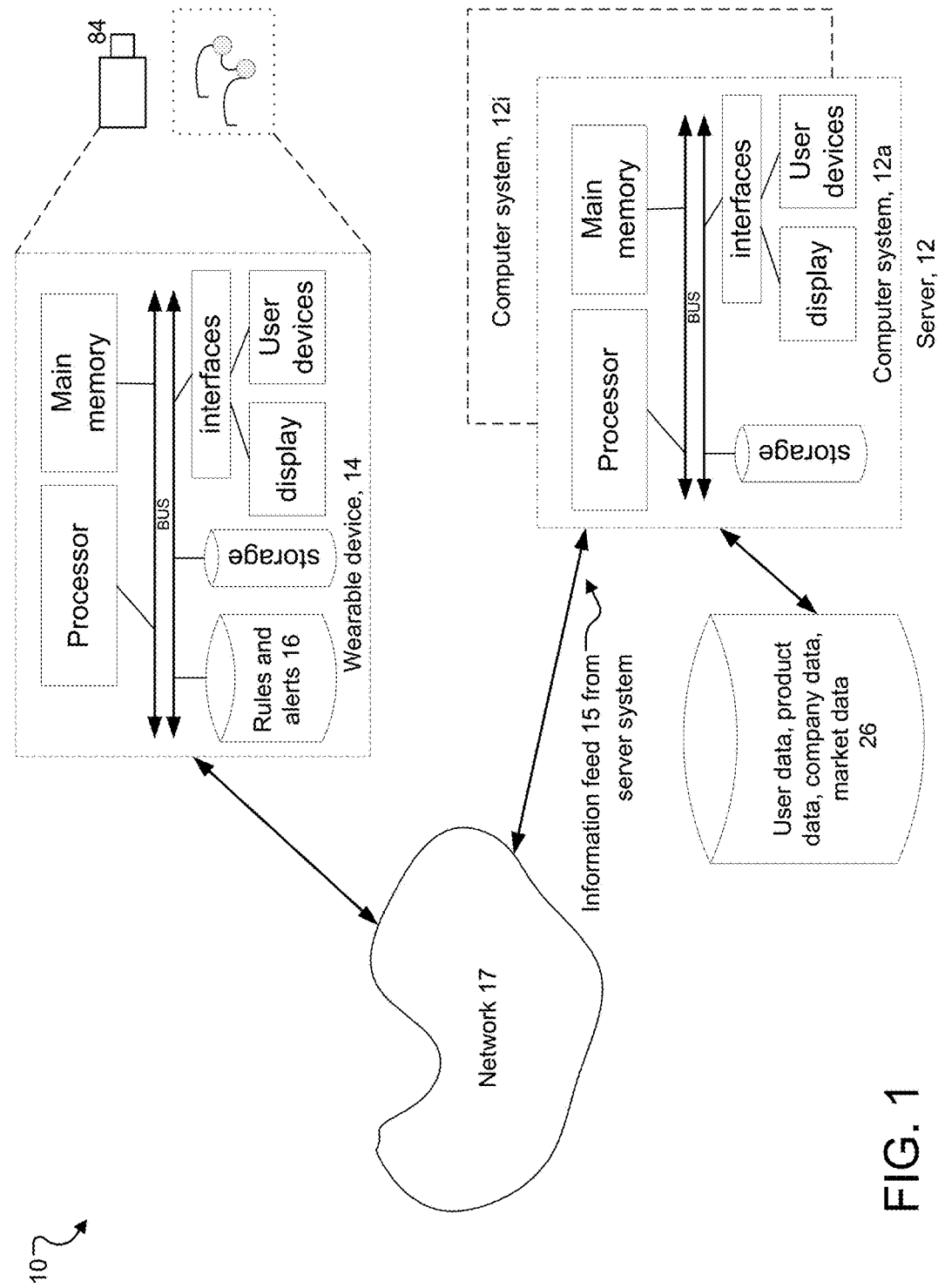
FIG. 1 is a block diagram of an arrangement for presenting information to a user of a wearable device.

Referring now to FIG. 1, a system 10 includes a server type of system 12 and a wearable device 14. The wearable device 14 includes a processor, memory, and computer storage that stores a computer program product that, when executed, provides information regarding objects within a user's field of view. The wearable device 14 receives user input specifying criteria for providing information to the user about the objects within the user's field of view. The input is received through a user input interface of the wearable device 14.

The wearable device 14 generates rules and alerts from the specified criteria and stores the rules and alerts in a local database 16. The wearable device 14 applies the rules and alerts to information received from the server 12 to determine whether to provide the information to the user.

In a variation, the wearable device 14 transmits the specified criteria to the server 12, and the server 12 generates the rules and alerts from the specified criteria and stores the rules and alerts in a database 26. The server 12 applies the rules and alerts to information retrieved from the database 26 to determine whether to provide information to the wearable device 14.

The wearable device 14 is any type of device capable of displaying information such as a set of smart eyeglasses (or another type of wearable device). Smart eyeglasses (hereinafter eyeglasses) allow the user to see through lenses of the eyeglasses and observe the real world as a normal set of eyeglasses. The eyeglasses are configured to generate informational depictions about objects in the user's field of view and project the informational depictions onto the lenses of the eyeglasses.

The eyeglasses include a processor that processes an image depicting the user's field of view. The image is received from, e.g., a camera 84 mounted in or on the eyeglasses. The processor identifies objects present in the images and requests information about the objects from server 12. If the information about the objects satisfies the criteria input by the user, the eyeglasses generates the informational depictions about the objects and projects the informational depictions onto the lenses.

In a variation, the eyeglasses transmit the image to the server 12. The server 12 identifies objects present in the images and retrieves information about the objects from the database 26. The server 12 determines whether the information about the objects satisfies the criteria input by the user, generates the informational depictions about the objects, and transmits the informational depictions to the eyeglasses. The eyeglasses project the received informational depictions onto the lenses for the user to view.

The informational depictions are rendered in juxtaposition with an object in the user's field of view, are rendered such that the informational depictions block an object in the user's field of view, or are rendered so as to cover the user's entire field of vision. The system 10 is configured to generate the informational depictions as pictorial representations that have text corresponding to the information. Informational depictions include balloon depictions, callouts, cartoons, simple text boxes, etc.

The server 12 comprises of one or more computer systems 12a-12i. Each computer system 12a-12i includes processor, memory, and computer storage that stores a computer program product that, when executed, receives requests for information from and provides the information to the wearable device 14. The requests are received and information (generally 15) is provided over a network 17, which is a wired and/or wireless network. To service the requests, the server 12 retrieves data such as user data, product data, company data, and market data from a local database 16 or remote database 26. Some of the data in the database 26 are provided and/or maintained by a third party website or service.

User data includes information about the user such as user account data, user activity data, user preference data, user specified alerts and rules, and so forth. User data includes information about financial items in the user's investment portfolio, businesses the user visited over a period of time, and the user's purchase history and transaction records. The user data includes information about the user's preferences for certain types of products or certain types of businesses. The user data includes information about the user's health such as weight, heart rate, blood pressure, and cholesterol level.

Product data includes data about consumer products. Product data for a food product includes brand, ingredients, nutritional values, health index, cost, whether it's organic, whether it's gluten free, and so forth. Product data for apparel includes brand, materials, location of manufacture, and so forth. Product data includes information about whether the product is a fair trade good, whether the product is produced by a company in the user's investment portfolio, and so forth.

Company data includes data about companies associated with physical stores, online stores, gas stations, financial institutions, stocks held by the user, and so forth. Data about a company includes information about whether the company is a publicly traded company, whether the company is a green company, where the company's products are manufactured, geographic locations of the company's physical stores, the company's competitors, etc. Market data includes real-time financial information relating to publically traded financial products such as a security (e.g., stock in publically traded companies), a financial index, a commodity contract, an options contract, a commodities index, as well as other financial products traded on a trading venue.

The user uses the wearable device 14 throughout the day. Over a period of time, the user visits many businesses, such as stores and gas stations. The system 10 collects information about the user's activities, analyzes the information, and determines the user's routines and preferences from the collected information, as discussed below.

The system 10 determines whether the user is a green shopper by analyzing the user's purchase history with the information about the companies associated with the user's purchases. The server 12 accessing the user's purchase history, such as the user's transaction records associated with a credit card, a debit card, a reward card linked to a store, a financial account, etc., stored in the database 26. The system 10 analyzes the user's purchase history to determine the products that were purchased, the companies from which the products were purchased, the companies that manufactured the products that were purchased, etc. The server 12 retrieves information about the products and the companies from the database 26 to determine whether the products purchased by the user are green products or are purchased from or manufactured by green companies.

The system 10 determines whether the user's purchases support the publicly traded companies in the user's investment portfolio by analyzing the user's purchase history with the information about the companies in the user's investment portfolio. The server 12 accesses the user's investment portfolio and purchase history from the database 26. The server 12 analyzes the user's purchase history to determine the products that were purchased, the companies from which the products were purchased, the companies that manufactured the products that were purchased, etc. The system 10 determines whether the products purchased by the user were provided by or manufactured by a company in the user's investment portfolio.

The wearable device 14 uses the camera as a sensor to capture data regarding the user's daily routine. For example, the user walks into a store, and the camera 84 of the wearable device 14 captures an image of the store. The wearable device 14 includes a global positioning system (GPS) device that determines the geographic location of the user. The system 10 analyzes the image to determine the name of the store, such as by applying by the processor optical character recognition to the image to extract text from the image. The wearable device 14 transmits the geographic location of the user to the server 12 to retrieve a list of stores at the user's geographic location. The wearable device 14 transmits the image and the geographic location to the server 12, and the server 12 determines the name of the store by comparing the captured image with images in the database 26 of store fronts associated with the geographic location.

The wearable device 14 requests information about the store from the server 12 in real time as the store is in the user's field of view. The server 12 retrieves information about the store from the database 26. The server 12 transmits the information to the wearable device 14. The wearable device 14 applies the rules stored in database 16 to the received information about the store to determine whether the information satisfies criteria specified by the user. In a variation, the server 12 applies the rules stored in database 26 to the information about the store to determine whether the information satisfies criteria specified by the user.

The user provides criteria for a rule (that is generated by server 12) that when executed provides an alert to notify the user when the user is approaching a green company. The system 10 applies the green company criteria to the information about the store. If the information indicates that the company is a green company, the wearable device 14 presents a notification to the user that the user is approaching a green company. Similarly, the user may have produced another rule that alerts the user when the user is approaching a non-green company. The system 10 applies the non-green company criteria to the received information about the store. If the information indicates that the company is a non-green company, the wearable device 14 presents a notification to the user that the user is approaching a non-green company. The wearable device 14 also presents information to the user about an alternative company that is a green company and that is located nearby.

The server 12 determines whether a company is a green company using information about the company retrieved from database 26. The server 12 identifies certain characteristics of a company that signify the company as a green company. When a company has those certain characteristics, the server 12 identifies the company as a green company and stores this classification with the company information in the database 26.

The user configures the system 10 to generate a report based on the collected information about the user's activities. The system 10 is configured to analyze the user's purchase history and generate a report specifying the cost difference between the cost of the user's purchases from green companies and the cost of purchasing the products from alternative non-green companies. The wearable device 14 requests information from the server 12, such as the average cost difference between purchasing products from green companies versus non-green companies. The server 12 determines the requested information by accumulating and analyzing data from multiple wearable devices. The server 12 transmits the requested information to the wearable device 14, and the wearable device 14 includes the average cost difference in the report which the user uses to compare the user's cost difference with the average cost difference.

The system 10 (e.g., in particular server 12) uses collected information about the user's activities to generate suggestions or recommendations for saving money on future purchases for presentation to the user. The system 10 collects information about the user's purchase history such as transaction records and locations were the purchases were made. The system 10 receives transaction records, such as credit or debit card records, from the database 26. The wearable device 14 collects location data using the GPS device.

At the end of a specified time period, the system 10 analyzes the user's purchase activities to generate purchase or cost data. The system 10 compares the cost data for the user's purchase activities to cost data for the same or similar products from alternative stores. The system 10 produces recommendations in the form of visual notifications of different stores than the stores that the user has purchased products from in the past that saves the user money. The system 10 determines that the user purchased groceries from one grocery store over the past month and generates cost data from the purchases made at the grocery store. The system 10 identifies a similar grocery store about one mile away from the grocery store the user visited during the past month. The system 10 generates cost data for the same or similar purchases at the other grocery store. The system 10 compares the cost data for the two grocery stores and recommends to the user purchases from the other grocery store that saves the user money.

The user of the wearable device 14 sometimes becomes bewildered with the numerous choices that are available when searching for and purchasing goods or services. The user desires to purchase goods or services that have particular attributes, or to purchase goods or services from companies that meet certain criteria. Sometimes the user is not aware of the attributes of the good, the service, or the company providing the good or service. The wearable device 14 allows the user to shop, physically or virtually, using the wearable device 14. The system 10 augments the user's field of view with the set of informational depictions. In this way, the system 10 produces a store of goods or services with the particular attributes desired by the user.

For example, the user may input a criterion that products be fair trade goods. Based on the user-specified criterion (e.g., of fair trade), system 10 generates a rule to perform one or more actions (such as notifications), upon detection of an object in the field of view that is associated with attributes satisfying the criterion, as shown in the below Table 1

TABLE 1

Rule for User specified criteria
<When object attributes == criteria(fair trade), then send notification && visually enhance object in visual representation?

As shown in the above Table 1, system 10 executes a rule when the criteria of the rule are satisfied by attributes of object in the field of view. Upon execution of the rule, system 10 implements one or more actions such as causing an informational depiction to be presented via the display of the wearable device that visually eliminates or enhances the detected object in the field of view of the user. System 10 detects attributes of objects in the field of view by identifying which portions of the field of view image represent objects, such as a store. System 10 performs this detection by performing image recognition on portions of the field of view images and comparing portions of the image to images stored in database that have been previously identified as representing various objects. In a variation, system 10 performs optical character recognition on one or more portions of the field of view image to identify which objects are visually represented in the field of view image. An object in the field of view image is labeled with a name, thereby enabling system 10 to identify that object using character recognition.

Having detected the various objects in the field of view image, system 10 identifies attributes of the detected objects to determine which objects have attributes satisfying the user-specified criteria. System 10 queries one or more data repositories for information indicative of attributes of the detected objects. System 10 compares the attributes to the criteria of the various rules to determine which attributes satisfy the criteria. In a variation, system 10 accesses from a data repository a mapping of keywords to other related or synonymous keywords, to expand an amount of keywords that are used in identifying relevant user-specified criteria. Using the received attributes, system 10 determines which attributes match keywords that are mapped to other keywords in the mapping. System 10 compares these other keywords to the criteria of the rules to determine a match that causes rule execution. These other keywords are also associated (e.g., indirectly) with objects in the field of view images, because these other keywords are mapped to keywords that match the original attributes of the objects. Any of the techniques and operations described above and herein may be performed by system 10 and/or more particularly by server 12 or by wearable device 14.

Figure 2:
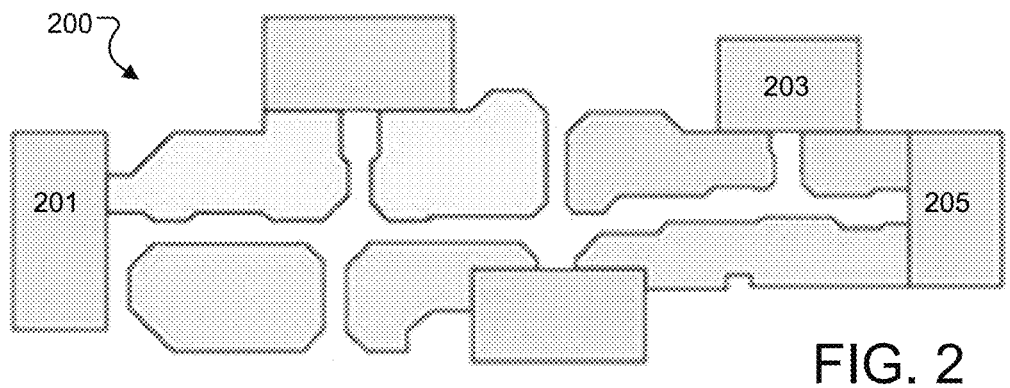
FIG. 2 is a pictorial depiction of a field of view of a user of a wearable device.
Figure 3:
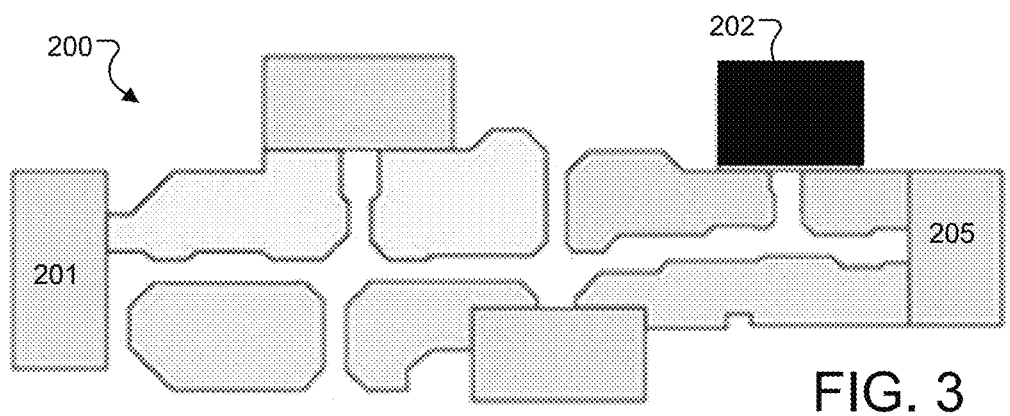
FIG. 3 is a pictorial depiction of an object in the user's field of view being visually eliminated.
Figure 4:
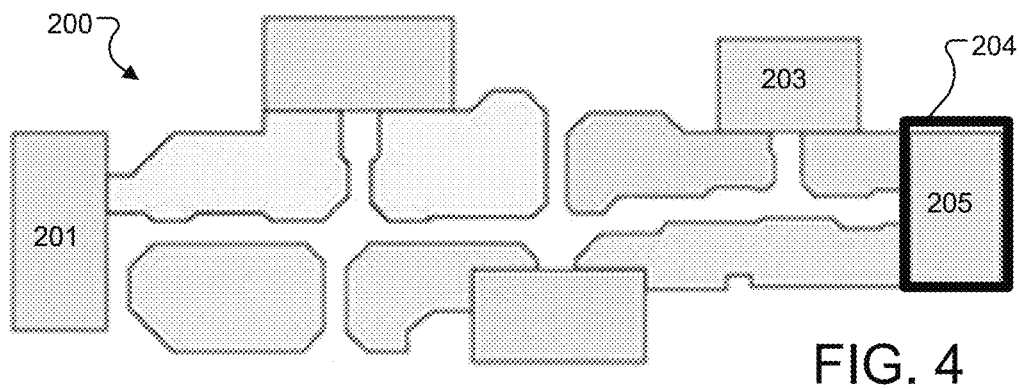
FIG. 4 is a pictorial depiction of an object in the user's field of view being visually enhanced.

Referring now also to FIGS. 2-4, the wearable device 14 produces various notifications according to results of executing user defined rules, of which the above rules are examples, and projects these results as visual notifications on the lenses of the eyeglasses in relation to objects in the user's field of view. The system 10 applies the visual notifications that result for executing a rule according to the criterion (e.g., fair trade goods) to collection 200 of objects in the user's field of view. The collection 200 may be, for example, individual products in a physical or online store, or stores, e.g., stores 201, 203, and 205, presented on a physical or virtual display of a shopping center or mall directory as shown in FIG. 2.

The wearable device 14 visually eliminates objects that are associated with non-fair trade goods from the user's field of view or visually enhance objects that are associated with fair trade goods. The wearable device 14 visually eliminates an object by, for example, placing an opaque shape on an area of the display that corresponds to the physical location of the object to cover the object from the user's field of view. For example, the wearable device 14 places an opaque shape 202 on an area of the display of the wearable device 14 that corresponds to the physical location of the store 203 in the mall directory 200 that is associated with non-fair trade goods to cover the store as shown in FIG. 3. The wearable device 14 visually enhances an object by placing an outlined transparent shape on an area of the display that corresponds to the physical location of the object to outline the object in the user's field of view. For example, the wearable device 14 places an outlined transparent shape 204 on an area of the display of the wearable device 14 that corresponds to the physical location of the store 205 in the mall directory 200 that is associated with fair trade goods as shown in FIG. 4.

To determine where to project the shape onto the lenses to visually eliminate or enhance an object, the system 10 uses shape recognition and/or optical character recognition (OCR) to determine position and size of objects, e.g., shapes and text, in the image captured by the camera 84 of the wearable device 14. Each object detected in the image is associated with position and size information, which corresponds to its location and size as seen through the lenses of the wearable device 14. The position information is represented by X-axis and Y-axis coordinate information, and the size information is represented by height and width information. The wearable device 14 projects the shape onto an area of the lenses specified by the position and size information of the object that the shape is to visually eliminate or enhance.

Other criteria include products that are gluten free, products associated with companies in the user's investment portfolio, products that have above a certain amount of sugar or fat, etc. The criteria is also determined by the system 10 based on physiological data about the user received from a health monitor such as blood pressure or cholesterol monitor.

The system 10 is used for real-time market monitoring. Real-time market monitoring involves collecting enormous amounts of data for characterizing how a market is performing and presenting large amounts of collected data to the user to get a sense of trading trends. A user, such as a trader, is presented with information via a telephone, with multiple lines, a Bloomberg Terminal, and up to six other screens. The user finds such large amounts of data to be inconvenient or complex, and misses important pieces of time-sensitive information when being presented with large amounts of data simultaneously.

The user inputs into the wearable device 14 criteria such as price or volume of a certain stock or bond. Wearable device 14 includes specific eye enhancing tools, including, e.g., Google Glass, Oculus, and so forth. When the system 10 identifies information in the user's field of view that satisfies the criteria, the wearable device 14 notifies the user by providing information about the stock or bond along with controls that allow the user to buy or sell the stock or bond. The wearable device 14 requests the information about the stock or bond from the server 12. The wearable device 14 presents the information as an overlay in the virtual reality environment. In effect, the wearable device 14 reduces the user's exposure to information from six screens of real-time market monitoring information to one screen that presents information that is desired by the user.

Figure 5:
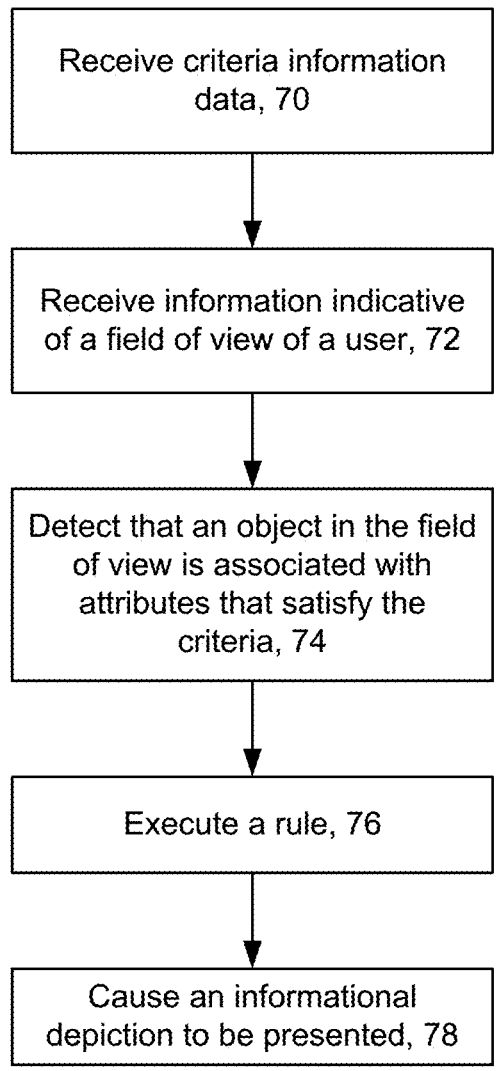
FIG. 5 is a flow chart diagram of a process for presenting information to a user of a wearable device.

Referring to FIG. 5, the system 10 receives (70) criteria information data that specifies one or more criteria for providing information to a user of a wearable device. The system receives (72), based on the one or more criteria, information indicative of a field of view of the user of the wearable device. The system detects (74) that an object in the field of view is associated with one or more attributes that satisfy the user-specified criteria. Responsive to detection, the system executes (76) a rule associated with one or more attributes that satisfy the user-specified criteria. Based on execution of the rule, the system causes (78) an informational depiction to be presented via a display of the wearable device that visually eliminates or enhances the detected object in the field of view of the user.

The user is anonymized so that the user is not personally identified and thereby protect user privacy. The users are provided with an opportunity to opt in/out of programs or features that collect the personal information. In addition, certain data is anonymized in one or more ways before it is stored or used, so that personally identifiable information is removed. A user's identity is anonymized so that no personally identifiable information is determined for the user and so that any identified user preferences or user interactions are generalized (e.g., generalized based on user demographics) rather than associated with a particular user. In addition, the information stored about the user is deleted after a predetermined period of time.

A block diagram of components of the system 10 is shown. Server 12 is any of a variety of computing devices capable of receiving information, such as a server, a distributed computing system, a desktop computer, a laptop, a cell phone, a rack-mounted server, and so forth. Server is a single server or a group of servers that are at a same location or at different locations.

Server receives information from wearable devices via a communication interface. Interfaces are any type of interface capable of receiving information over a network, such as an Ethernet interface, a wireless networking interface (e.g., Wi-Fi, Bluetooth®, radio frequency interfaces, and so forth), a fiber-optic networking interface, a modem, and so forth. Server also includes a processor and memory. A bus system (not shown), including a data bus and a motherboard, is used to establish and to control data communication between the components of server.

Processor includes one or more microprocessors. Generally, processor includes any appropriate processor and/or logic that is capable of receiving and storing data, and of communicating over a network (not shown). Memory includes a hard drive and a random access memory storage device, such as a dynamic random access memory, machine-readable media, or other types of non-transitory machine-readable storage devices.

Components also include storage device, which is configured to store information, map, map templates, rules data for the rules, software for the rules engine, etc.

Embodiments are implemented in digital electronic circuitry, or in computer hardware, firmware, software, or in combinations thereof. Apparatus of the invention is implemented in a computer program product tangibly embodied or stored in a machine-readable storage device and/or machine readable media for execution by a programmable processor; and method actions are performed by a programmable processor executing a program of instructions to perform functions and operations of the invention by operating on input data and generating output. The invention is implemented advantageously in one or more computer programs that are executable on a programmable system including at least one programmable processor coupled to receive data and instructions from, and to transmit data and instructions to, a data storage system, at least one input device, and at least one output device. Each computer program is implemented in a high-level procedural or object oriented programming language, or in assembly or machine language if desired; and in any case, the language is a compiled or interpreted language.

Suitable processors include both general and special purpose microprocessors. Generally, a processor will receive instructions and data from a read-only memory and/or a random access memory. Generally, a computer will include one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including semiconductor memory devices, such as EPROM, EEPROM, and flash memory devices; magnetic disks such as internal hard disks and removable disks; magneto-optical disks; and CD_ROM disks. Any of the foregoing is supplemented by, or incorporated in, ASICs (application-specific integrated circuits).

Other embodiments are within the scope and spirit of the description claims. Due to the nature of software, functions described above are implemented using software, hardware, firmware, hardwiring, or combinations of any of these. Features implementing functions are also be physically located at various positions, including being distributed such that portions of functions are implemented at different physical locations.

What is claimed is:

1. A system comprising:
    one or more processors; and
    one or more machine-readable hardware storage devices storing instructions that are executable by the one or more processors to:
        receive criteria information data that specifies one or more criteria for providing information to a user of a wearable device, wherein the criteria information data includes physiological data of the user as received from one or more of a blood pressure monitor or a cholesterol monitor associated with the user;
        receive information indicative of a field of view of the user of the wearable device, the field of view including a plurality of physical objects visible to the user;
        detect that at least one physical object in the field of view is associated with one or more attributes from a first set of attributes;
        identify a second set of attributes of the detected at least one physical object by mapping the first set of attributes to one or more keywords in a data repository and extracting one or more of the keywords as the second set of attributes;
        responsive to detection and identification, execute a rule associated with one or more attributes from the first set of attributes or one or more attributes from the second set of attributes that satisfy the criteria; and
        based on execution of the rule, cause an overlay to be presented via a display of the wearable device that visually removes the detected physical object in the field of view of the user so as to reduce a number of physical objects visible to the user.

2. The system of claim 1, wherein the one or more processors are further configured to:
    receive location data indicative of a current geographic location of the user; and
    identify at least one of the plurality of physical objects in the field of view based on the location data.

3. The system of claim 1, wherein the one or more processors are further configured to:
    cause alternative recommendations information to be presented via the display of the wearable device based on the one or more criteria.

4. The system of claim 1, wherein the one or more processors are further configured to:
    receive one or more images captured by a camera of the wearable device; and
    detect at least one physical object in the one or more images captured by the camera.

5. The system of claim 4, wherein the one or more processors are further configured to:
    identify the at least one physical object in the one or more images captured by the camera using optical character recognition.

6. The system of claim 1, wherein the one or more criteria comprise at least one of an attribute of a product, an attribute of a company, or a value relating to a financial item.

7. The system of claim 1, wherein the one or more processors are further configured to:
    retrieve notification information pertaining to one or more of the plurality of physical objects in the field of view; and
    cause the notification information to be presented via a display of the wearable device based on the retrieved information satisfying the one or more criteria.

8. The system of claim 1, wherein the one or more processors and the one or more machine-readable hardware storage devices are contained within the wearable device.

9. The system of claim 1, wherein the one or more processors and the one or more machine-readable hardware storage devices are contained within a server computing device that is coupled to the wearable device.

10. The system of claim 1, wherein the overlay comprises an opaque shape positioned on an area of the display of the wearable device that corresponds to a location of the physical object in the field of view, and wherein the opaque shape visually eliminates the physical object from the field of view.

11. A computer program product, tangibly embodied in a non-transitory computer readable storage device, the computer program comprising instructions to cause a processor to:
    receive criteria information data that specifies one or more criteria for providing information to a user of a wearable device, wherein the criteria information data includes physiological data of the user as received from one or more of a blood pressure monitor or a cholesterol monitor associated with the user;
    receive information indicative of a field of view of the user of the wearable device, the field of view including a plurality of physical objects visible to the user;

detect that at least one physical object in the field of view is associated with one or more attributes from a first set of attributes;

identify a second set of attributes of the detected at least one physical object by mapping the first set of attributes to one or more keywords in a data repository and extracting one or more of the keywords as the second set of attributes;

responsive to detection and identification, execute a rule associated with one or more attributes from the first set of attributes or one or more attributes from the second set of attributes that satisfy the criteria; and based on execution of the rule, cause an overlay to be presented via a display of the wearable device that visually removes the detected physical object in the field of view of the user so as to reduce a number of physical objects visible to the user.

12. The computer program product of claim 11, wherein the instructions cause the processor to:

receive location data indicative of a current geographic location of the user; and identify at least one of the plurality of physical objects in the field of view based on the location data.

13. The computer program product of claim 11, wherein the instructions cause the processor to:

cause alternative recommendations information to be presented via the display of the wearable device based on the one or more criteria.

14. The computer program product of claim 11, wherein the instructions cause the processor to:

receive one or more images captured by a camera of the wearable device; and detect at least one physical object in the one or more images captured by the camera.

15. The computer program product of claim 14, wherein the instructions cause the processor to:

identify the at least one physical object in the one or more images captured by the camera using optical character recognition.

16. The computer program product of claim 11, wherein the one or more criteria comprise at least one of an attribute of a product, an attribute of a company, or a value relating to a financial item.

17. The computer program product of claim 11, wherein the instructions cause the processor to:

retrieve notification information pertaining to one or more of the plurality of physical objects in the field of view; and cause the notification information to be presented via a display of the wearable device based on the retrieved information satisfying the one or more criteria.

18. The computer program product of claim 11, wherein the overlay comprises an opaque shape positioned on an area of the display of the wearable device that corresponds to a location of the physical object in the field of view, and wherein the opaque shape visually eliminates the physical object from the field of view.

19. A method comprising:

receiving, by one or more processors, criteria information data that specifies one or more criteria for providing information to a user of a wearable device, wherein the criteria information data includes physiological data of the user as received from one or more of a blood pressure monitor or a cholesterol monitor associated with the user;

receiving, by the one or more processors, information indicative of a field of view of the user of the wearable device, the field of view including a plurality of physical objects visible to the user;

detecting, by the one or more processors, that at least one physical object in the field of view is associated with one or more attributes from a first set of attributes;

identifying, by the processor, a second set of attributes of the detected at least one physical object by mapping the first set of attributes to one or more keywords in a data repository and extracting one or more of the keywords as the second set of attributes;

responsive to detection and identification, executing, by the one or more processors, a rule associated with one or more attributes from the first set of attributes or one or more attributes from the second set of attributes that satisfy the criteria; and based on execution of the rule, causing, by the one or more processors, an overlay to be presented via a display of the wearable device that visually removes the detected physical object in the field of view of the user so as to reduce a number of physical objects visible to the user.

20. The method of claim 19, further comprising:

receiving location data indicative of a current geographic location of the user; and identifying at least one of the plurality of physical objects in the field of view based on the location data.

21. The method of claim 19, further comprising:

causing alternative recommendations information to be presented via the display of the wearable device based on the one or more criteria.

22. The method of claim 19, further comprising:

receiving one or more images captured by a camera of the wearable device; and detect at least one physical object in the one or more images captured by the camera.

23. The method of claim 22, further comprising:

identifying the at least one physical object in the one or more images captured by the camera using optical character recognition.

24. The method of claim 19, wherein the one or more criteria comprise at least one of an attribute of a product, an attribute of a company, or a value relating to a financial item.

25. The method of claim 19, further comprising:

retrieving notification information pertaining to one or more of the plurality of physical objects in the field of view; and causing the notification information to be presented via a display of the wearable device based on the retrieved information satisfying the one or more criteria.

26. The method of claim 19, wherein the overlay comprises an opaque shape positioned on an area of the display of the wearable device that corresponds to a location of the physical object in the field of view, and wherein the opaque shape visually eliminates the physical object from the field of view.

* * * * *